(12) United States Patent
Brown et al.

(10) Patent No.: US 11,094,958 B2
(45) Date of Patent: Aug. 17, 2021

(54) FUEL CELL MODULE AND METHOD OF OPERATING SUCH MODULE

(71) Applicant: Cummins Enterprise LLC, Indianapolis, IN (US)

(72) Inventors: Keith Garrette Brown, Clifton Park, NY (US); Darren Bawden Hickey, Halfmoon, NY (US)

(73) Assignee: CUMMINS ENTERPRISE LLC, Indianapolis, IN (US)

(*) Notice: Subject to any disclaimer, the term of this patent is extended or adjusted under 35 U.S.C. 154(b) by 12 days.

(21) Appl. No.: 14/867,409

(22) Filed: Sep. 28, 2015

(65) Prior Publication Data

US 2017/0092976 A1 Mar. 30, 2017

(51) Int. Cl.
*H01M 8/24* (2016.01)
*H01M 8/248* (2016.01)
(Continued)

(52) U.S. Cl.
CPC .......... *H01M 8/248* (2013.01); *H01M 8/2432* (2016.02); *H01M 8/00* (2013.01);
(Continued)

(58) Field of Classification Search
CPC ...... H01M 8/00; H01M 8/04; H01M 8/04089; H01M 8/04753; H01M 8/06;
(Continued)

(56) References Cited

U.S. PATENT DOCUMENTS 3,736,187 A * 5/1973 Harrison ................. H01M 8/00
429/410
5,419,980 A 5/1995 Okamoto et al.
(Continued)

FOREIGN PATENT DOCUMENTS

CN 102723507 10/2012
CN 104037434 1/2017
(Continued)

OTHER PUBLICATIONS

English machine translation of Sato Katsumi, Fastening Device for Fuel Celli in JP H09139225 (A)—May 27, 1997 pdf file attached.*
(Continued)

*Primary Examiner* — Jonathan G Jelsma
*Assistant Examiner* — Omar M Kekia
(74) *Attorney, Agent, or Firm* — Barnes & Thornburg LLP

(57) ABSTRACT

An electric power generation system includes a fuel cell module. The fuel cell module includes a fuel cell and a compression plate. The compression plate includes a surface contacting the fuel cell. A support plate is opposite the compression plate. The compression plate is movable in relation to the support plate. A pressurized fluid container is disposed between the compression plate and the support plate. The pressurized fluid container includes a casing defining an internal space configured to contain pressurized fluid. The electric power generation system further includes a pressurized fluid source and a fluid line coupled to the pressurized fluid source and the pressurized fluid container.

19 Claims, 4 Drawing Sheets

(51) Int. Cl.

| | | |
|---|---|---|
| *H01M 8/2432* | (2016.01) | |
| *H01M 8/14* | (2006.01) | |
| *H01M 8/124* | (2016.01) | |
| *H01M 8/04082* | (2016.01) | |
| *H01M 8/04* | (2016.01) | |
| *H01M 8/00* | (2016.01) | |
| *H01M 8/06* | (2016.01) | |
| *H01M 8/04089* | (2016.01) | |
| *H01M 8/04746* | (2016.01) | |

(52) U.S. Cl.
CPC .......... *H01M 8/04* (2013.01); *H01M 8/04089* (2013.01); *H01M 8/04201* (2013.01); *H01M 8/04753* (2013.01); *H01M 8/06* (2013.01); *H01M 2008/1293* (2013.01); *H01M 2008/147* (2013.01); *Y02E 60/50* (2013.01)

(58) Field of Classification Search
CPC ............. H01M 8/04201; H01M 8/248; H01M 2008/1293; H01M 2008/147; H01M 8/2432; Y02E 60/526
USPC ............................................................ 429/469
See application file for complete search history.

(56) References Cited

U.S. PATENT DOCUMENTS

| | | | | |
|---|---|---|---|---|
| 5,532,073 A * | 7/1996 | Hirata | ................ | H01M 8/2483 |
| | | | | 429/460 |
| 6,835,486 B2 | 12/2004 | Prediger et al. | | |
| 8,785,074 B2 | 7/2014 | Edmonston et al. | | |
| 2003/0059661 A1* | 3/2003 | Gorbell | ................ | H01M 8/247 |
| | | | | 429/465 |
| 2003/0232233 A1* | 12/2003 | Andrews | ............... | H01M 8/241 |
| | | | | 429/460 |
| 2007/0237999 A1 | 10/2007 | Donahue et al. | | |
| 2008/0014489 A1 | 1/2008 | Nielsen et al. | | |
| 2008/0166598 A1 | 7/2008 | Mahlanen | | |
| 2008/0311457 A1 | 12/2008 | Andreas-Schott et al. | | |
| 2009/0029205 A1 | 1/2009 | Venkataraman et al. | | |
| 2009/0242043 A1* | 10/2009 | Lev | ................... | H01M 8/04201 |
| | | | | 137/505.25 |
| 2012/0009499 A1 | 1/2012 | Hansen | | |
| 2012/0028159 A1 | 2/2012 | Nielsen et al. | | |
| 2014/0141351 A1 | 5/2014 | Shinohara et al. | | |
| 2015/0270588 A1* | 9/2015 | Masias | ............... | H01M 10/613 |
| | | | | 429/50 |

FOREIGN PATENT DOCUMENTS

| | | |
|---|---|---|
| DE | 19852363 | 5/2000 |
| JP | H06314571 | 11/1994 |
| JP | 09139225 A | 5/1997 |
| JP | H09 139225 | 5/1997 |
| JP | H09139224 | 5/1997 |
| JP | H117975 | 1/1999 |
| JP | 2006179287 | 7/2006 |
| JP | 2008234911 A | 10/2008 |
| WO | WO9609659 | 3/1996 |
| WO | WO2005028716 | 3/2005 |

OTHER PUBLICATIONS

European Search Report and Opinion issued in connection with corresponding EP Application No. 16188775.7 dated Dec. 13, 2016.

* cited by examiner

FUEL CELL MODULE AND METHOD OF OPERATING SUCH MODULE

BACKGROUND

The field of the disclosure relates generally to fuel cell modules and, more particularly, to fuel cell modules including compression mechanisms and methods of operation thereof.

Fuel cells are electrochemical energy conversion devices that have demonstrated a potential for relatively high efficiency and low pollution in power generation. A fuel cell generally provides a direct current (DC) which is converted to alternating current (AC) through an inverter. The DC or AC voltage is used to power motors, lights, and any number of electrical devices and systems. Fuel cells operate in stationary, semi-stationary, or portable applications.

Certain fuel cells, such as solid oxide fuel cells (SOFCs), operate in large-scale power systems that provide electricity to satisfy industrial and municipal needs. Others are useful for smaller portable applications such as powering cars. Other common types of fuel cells include phosphoric acid (PAFC), molten carbonate (MCFC), and proton exchange membrane (PEMFC), all generally named after their electrolytes.

A fuel cell produces electricity by electrochemically combining a fuel and an oxidant across an ionic conducting layer. This ionic conducting layer, also labeled the electrolyte of the fuel cell, is a liquid or solid. Fuel cells are typically amassed in electrical series in an assembly of fuel cells to produce power at useful voltages or currents. Therefore, interconnect structures are used to connect or couple adjacent fuel cells in series or parallel to form a fuel cell stack. In general, components of a fuel cell include the electrolyte, an anode, and a cathode. The reactions that produce electricity generally take place at the anode and cathode where a catalyst is typically disposed to speed the reactions. The anode and cathode are constructed to include channels and porous layers to increase the surface area for the chemical reactions to occur. The electrolyte carries electrically charged particles between the anode and cathode and is otherwise substantially impermeable to both fuel and oxidant.

In some known fuel cell modules, compression mechanisms are coupled to the fuel cells to maintain pressure in the fuel cells and, thereby, increase reliability and performance of the fuel cells. For example, in some systems, external compression mechanisms, such as air cylinders, are coupled to the fuel cells. However, heat is lost to the surrounding environment at the couplings between the fuel cells and the external compression mechanisms. The heat lost to the surrounding environment decreases the efficiency of the fuel cells. In other systems, bolts are used to maintain compression on the fuel cells. However, the bolts and surrounding components expand, i.e., creep, during operation of the fuel cells. As a result, compression of the fuel cells varies during operation of the fuel cells.

BRIEF DESCRIPTION

In one aspect, an electric power generation system includes a fuel cell module. The fuel cell module includes a fuel cell and a compression plate. The compression plate includes a surface contacting the fuel cell. A support plate is opposite the compression plate. The compression plate is movable in relation to the support plate. A pressurized fluid container is disposed between the compression plate and the support plate. The pressurized fluid container includes a casing defining an internal space configured to contain pressurized fluid. The electric power generation system further includes a pressurized fluid source and a fluid line coupled to the pressurized fluid source and the pressurized fluid container.

In another aspect, a fuel cell module includes a fuel cell and a compression plate. The compression plate includes a first surface contacting the fuel cell. A support plate is opposite the compression plate. The compression plate is movable in relation to the support plate. A pressurized fluid container is disposed between the compression plate and the support plate. The pressurized fluid container includes a casing defining an internal space configured to contain a pressurized fluid. The pressurized fluid container is configured to be coupled to a pressurized fluid source. The pressurized fluid source supplies pressurized fluid to said pressurized fluid container to maintain a substantially constant pressure within the internal space. The casing includes at least one flexible wall and is configured to change a volume of the internal space such that the compression plate moves in relation to the support plate.

In yet another aspect, a method of generating power using an electric power generation system is provided. The electric power generation system includes a fuel cell block and a pressurized fluid source. The fuel cell block includes a fuel cell and a pressurized fluid container disposed between a compression plate and a support plate. The method includes channeling pressurized fluid through a fluid line coupled to the pressurized fluid source and the pressurized fluid container. The pressurized fluid container includes a casing defining an interior space for containing the pressurized fluid. The casing includes a flexible wall positionable in an extended position, a collapsed position, and at least one intermediate position. The method further includes maintaining the pressure of the pressurized fluid in the pressurized fluid container at a predetermined value and positioning the flexible wall in one of the extended position, the collapsed position, and that at least one intermediate position such that the interior space changes in volume. The compression plate is moved in relation to the support plate such that pressure of the fuel cell remains substantially constant.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The fuel cell modules described herein include a compression mechanism to increase the efficiency and reduce the cost of generating electric power using fuel cell modules. In particular, the embodiments described herein provide consistent and reliable compression of a fuel cell and reduce the heat lost from the fuel cell modules. The embodiments described herein also facilitate a single pressurized fluid source supplying pressurized fluid to a plurality of fuel cell modules including individual compression mechanisms. Additionally, the compression mechanism increases the uniformity of the compressive forces applied to the fuel cells. Also, the compression mechanism increases the reliability of the fuel cell modules by reducing required maintenance.

Figure 1:
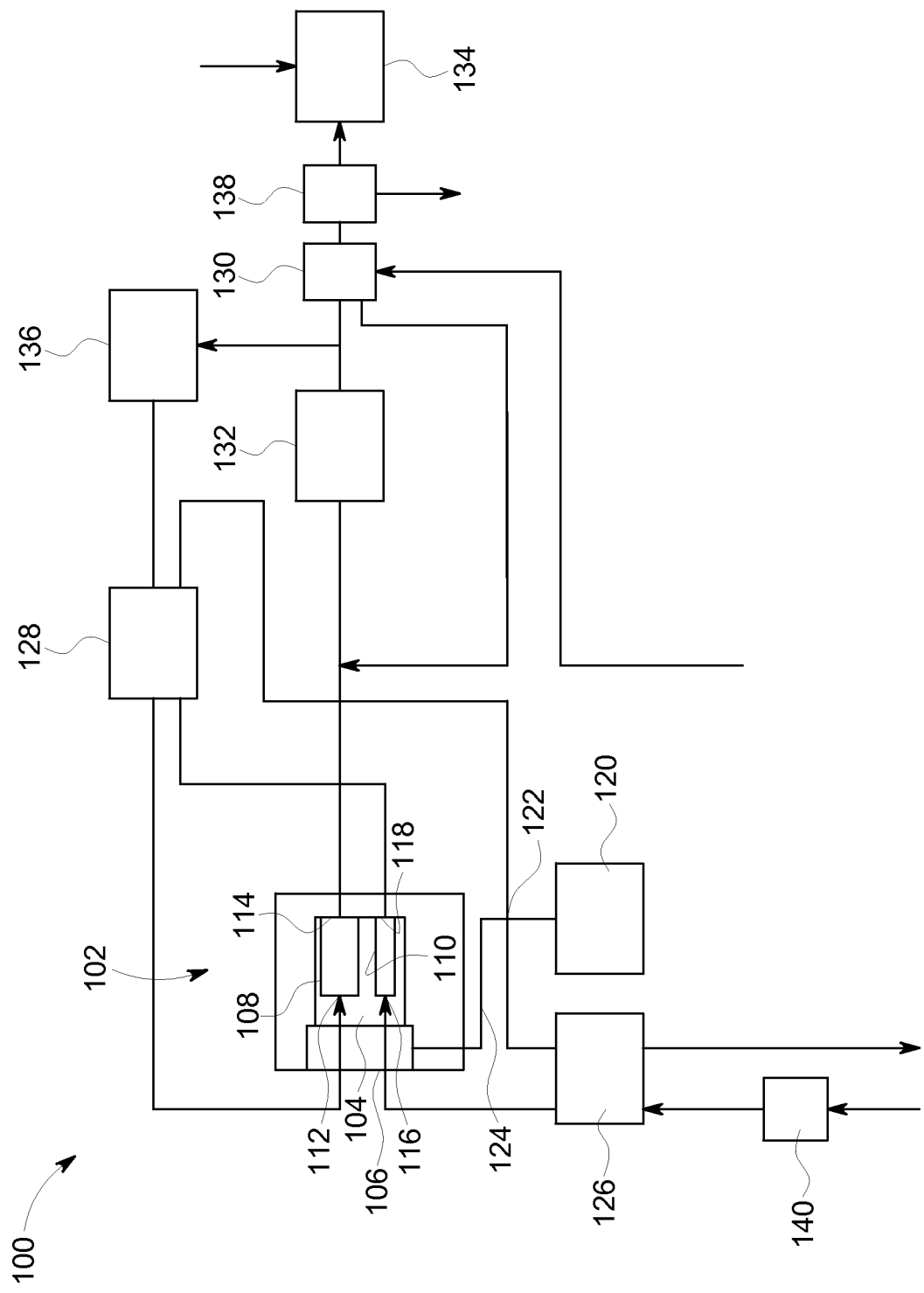
FIG. 1 is a schematic diagram of fluid flow through an exemplary power generation system.

FIG. 1 is a schematic view of an exemplary electric power generation system 100 that includes a fuel cell module 102. Fuel cell module 102 includes a fuel cell 104 and a fuel cell compression mechanism 106. Fuel cell 104 is one of a solid oxide fuel cell (SOFC) and a molten carbonate fuel cell (MCFC). Fuel cell 104 generates direct current (DC) electric power by electrochemically combining a fuel and an oxidant (both discussed further below) across an ionic conducting layer (not shown). The ionic conducting layer, i.e., an electrolyte of fuel cell 104, is a liquid or solid. In some embodiments, fuel cell 104 is positioned in electrical series in an assembly of fuel cells 104 (only one shown in FIG. 1) to produce power at useful voltages or currents.

In the exemplary embodiment, fuel cell 104 includes the electrolyte, an anode 108, and a cathode 110. The electrochemical reactions that produce DC electricity generally take place at anode 108 and cathode 110 where a catalyst (not shown) is disposed to speed the reactions. Anode 108 and cathode 110 include channels and porous layers (neither shown) to increase the surface area for the chemical reactions to occur. The electrolyte carries electrically charged particles from one of anode 108 and cathode 110 to the other and is otherwise substantially impermeable to both fuel and oxidant. To facilitate fuel flow through anode 108, anode 108 includes an inlet 112 and an outlet 114. Likewise, cathode 110 includes an inlet 116 and an outlet 118. Anode 108 discharges a tail gas stream from anode outlet 114 that includes water, hydrogen, carbon monoxide (CO), carbon dioxide ($CO_2$), and unreacted fuel, if any.

In the exemplary embodiment, power generation system 100 additionally includes a pressurized fluid source 120 to provide a pressurized fluid 122 to fuel cell compression mechanism 106 such that fuel cell compression mechanism 106 maintains a substantially constant pressure of fuel cell 104, as will be described in more detail below. Pressurized fluid source 120 is coupled in flow communication with fuel cell compression mechanism 106 by a pressurized fluid line 124 such that pressurized fluid 122 flows between pressurized fluid source 120 and fuel cell compression mechanism 106. Pressured fluid 122 supplied by pressurized fluid source 120 facilitates fuel cell compression mechanism 106 adjusting to changes in fuel cell 104 and maintain fuel cell 104 at a desired pressure. For example, as fuel cell 104 and fuel cell module 102 increase in temperature, pressurized fluid 122 flows into fuel cell compression mechanism 106 through pressurized fluid line 124 to facilitate maintaining fuel cell 104 at a desired pressure. In some embodiments, pressurized fluid 122 includes a gaseous mixture that is maintained at a pressure. In further embodiments, pressured fluid 122 is a gaseous mixture containing at least some nitrogen to reduce oxidation in power generation system 100. In alternative embodiments, pressurized fluid 122 is any fluid that enables power generation system 100 to function as described herein. In some embodiments, pressurized fluid source 120 is any source of a pressurized fluid 122 that enables power generation system 100 to function as described herein. For example, in some embodiments, pressurized fluid source 120 is a tank containing pressurized fluid 122 at a specified pressure. Additionally, in some embodiments, pressurized fluid source 120 is a blower which circulates pressurized fluid 122 and provides a continuous supply of pressurized fluid 122 to fuel cell compression mechanism 106.

In the exemplary embodiment, power generation system 100 also includes a first heat exchanger 126, a second heat exchanger 128, and a fuel preheater 130. First heat exchanger 126 is coupled in flow communication with fuel cell cathode inlet 116 and fuel cell cathode outlet 118 such that first heat exchanger 126 removes heat from fluid exhausted from fuel cell cathode and transfers heat to fluid that is channeled toward fuel cell cathode inlet 116. First heat exchanger 126 increases the temperature of fluid directed toward fuel cell cathode inlet 116 to a temperature in a range between about 600° Celsius (C) (1112° Fahrenheit (F)) and about 800° C. (1472° F.). Second heat exchanger 128 is coupled in flow communication with fuel cell cathode outlet 118 and fuel cell anode inlet 112 such that second heat exchanger 128 removes heat from fluid exhausted from fuel cell cathode outlet 118 and transfers heat to fluid that is channeled to fuel cell anode inlet 112. Second heat exchanger 128 increases the temperature of fuel directed toward fuel cell anode inlet 112 to a temperature in a range between about 600° C. (1112° F.) and about 800° C. (1472° F.). Fuel preheater 130 is coupled in flow communication with anode outlet 114 and in flow communication with a carbonaceous, i.e., hydrocarbon fuel source (not shown) that, in the exemplary embodiment, channels natural gas to fuel preheater 130. In alternative embodiments, any fuel is used that enables operation of power generation system 100 and fuel cell 104 as described herein.

Power generation system 100 further includes a hydrocarbon fuel reformer 132 coupled to fuel cell anode outlet 114 and fuel preheater 130. Hydrocarbon fuel reformer 132 converts a fuel stream including entrained tail gas stream to a hot reformed fuel stream with entrained carbon dioxide ($CO_2$). A combustion engine 134 is coupled in flow communication with hydrocarbon fuel reformer 132. The hot reformed fuel stream is channeled to combustion engine 134. In the exemplary embodiment, combustion engine 134 includes a reciprocating 4-stroke engine. In alternative embodiments, combustion engine 134 includes, for example, without limitation, a reciprocating 2-stroke engine, an opposed piston 2-stroke engine, and/or a gas turbine engine. In some embodiments, combustion engine 134 is mechanically coupled to an electric power generator and/or other load, e.g., without limitation, a pump and a compressor. A fuel heat exchanger 136 is coupled to hydrocarbon fuel reformer 132 such that fuel heat exchanger 136 warms a portion of fuel that is channeled from hydrocarbon fuel reformer 132 to fuel cell anode inlet 112.

In the exemplary embodiment, power generation system 100 further includes a water dehydrator or cooler 138 and a compressor 140. In alternative embodiments, cooler 138 and compressor 140 are omitted. In the exemplary embodiment, cooler 138 is coupled to fuel preheater 130 and lowers the temperature of fuel channeled from fuel preheater 130 towards combustion engine 134 such that water in the fuel condenses and is extracted. Compressor 140 is coupled to fuel cell module 102 and facilitates fluid moving through fuel cell module 102. In alternative embodiments, power generation system 100 includes any components coupled in any manner that enables power generation system 100 to function as described herein. For example, in some embodiments, power generation system 100 includes additional heat exchangers and fuel reformers. Additionally, in some embodiments, some components of power generation system 100 are coupled in parallel and/or in series.

Figure 2:
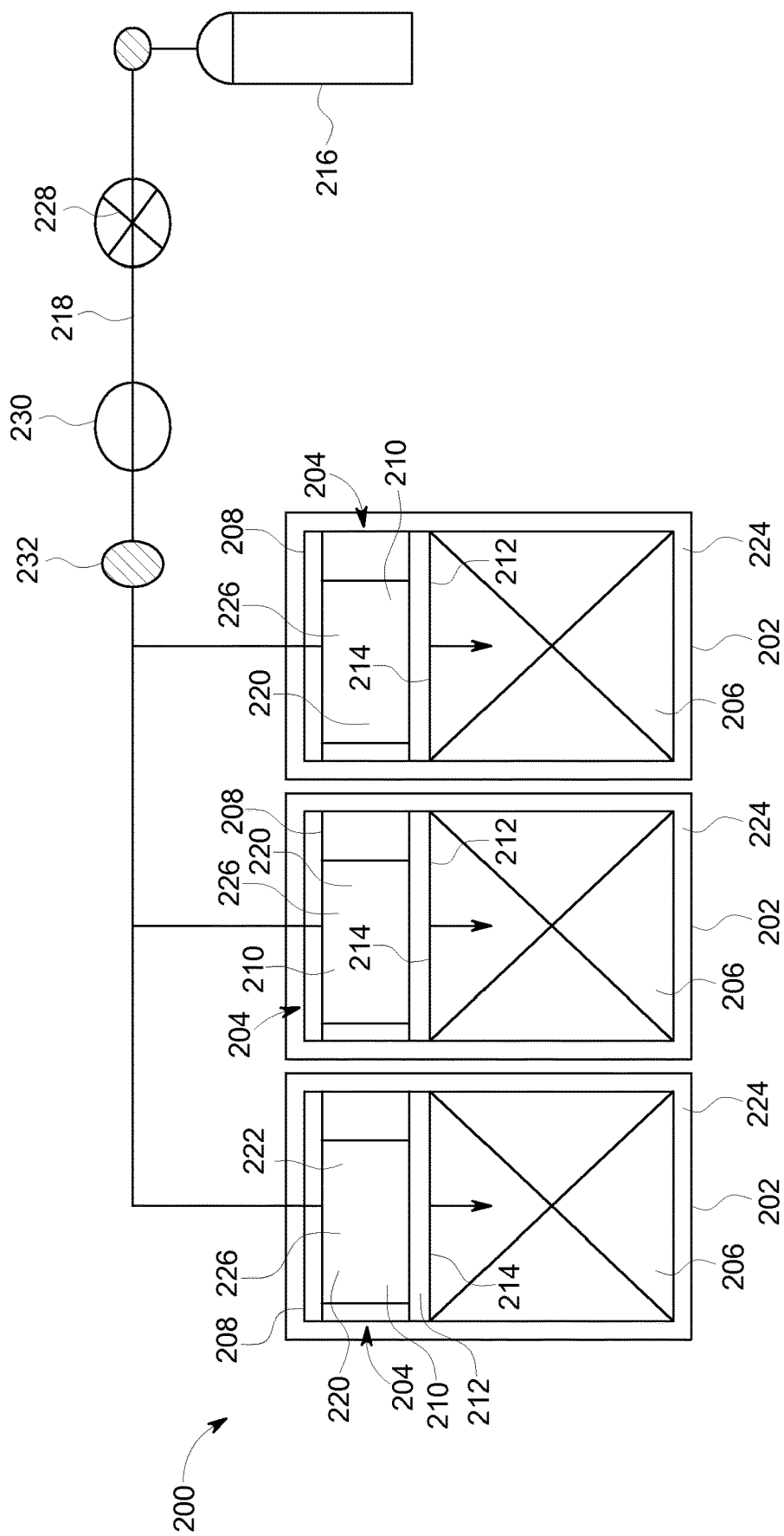
FIG. 2 is a section view of an exemplary fuel cell module for use in the power generation system shown in FIG. 1.

FIG. 2 is a section view of a fuel cell module 200 for use in power generation system 100. Fuel cell module 200 includes at least one fuel cell block 202. Each fuel cell block 202 includes a fuel cell compression mechanism 204 and a fuel cell stack 206. In the exemplary embodiment, each fuel cell block 202 has a power generation capacity defined as the amount of power generated by fuel cell block 202 during operation of fuel cell module 200. In some embodiments, each fuel cell block 202 has a power generation capacity in a range between about 0.1 kilowatts (kW) and about 500 kW. In further embodiments, each fuel cell block 202 has a power generation capacity in a range between about 1 kW and about 50 kW. In the exemplary embodiment, each fuel cell block 202 has a power generation capacity of approximately 15 kW.

Fuel cell module 200 has an overall power generation capacity that is the sum of the power generation capacities of fuel cell blocks 202. In some embodiments, fuel cell module 200 has an overall power generation capacity of between about 0.1 kW and about 1,500 kW. In further embodiments, fuel cell module 200 has an overall power generation capacity of between about 75 kW and about 250 kW. In some embodiments, fuel cell module 200 has an overall power generation capacity of approximately 180 kW. In the exemplary embodiment, fuel cell module 200 includes three fuel cell blocks 202 and each fuel cell block 202 has a power generation capacity of approximately 15 kW. Accordingly, fuel cell module 200 has an overall power generation capacity of approximately 45 kW. In alternative embodiments, fuel cell module 200 includes any number of fuel cell blocks 202 having any power generation capacities that enable fuel cell module 200 to function as described herein.

In the exemplary embodiment, fuel cell stack 206 includes a plurality of fuel cells 104 (shown in FIG. 1) including an electrolyte and two electrodes. Fuel cell stack 206 produces electricity by electrochemically combining a fuel and an oxidant across an ionic conducting layer. In the exemplary embodiment, fuel cell stack 206 includes fuel cells 104 that are solid oxide fuel cells. In alternative embodiments, fuel cell stack 206 includes any types of fuel cells that enable fuel cell module 200 to function as described herein.

Fuel cell compression mechanism 204 includes a support frame 208, a pressurized fluid container 210, and a compression plate 212. In the exemplary embodiment, compression plate 212 moves in relation to support frame 208. Compression plate 212 includes a first surface 214 that contacts fuel cell stack 206 such that compression plate 212 applies a force on fuel cell stack 206 configured to maintain the pressure of fuel cell stack 206. In the exemplary embodiment, first surface 214 is substantially planar and directly contacts fuel cell stack 206 throughout the area of first surface 214 such that the force on fuel cell stack 206 from compression plate 212 is distributed uniformly throughout fuel cell stack 206.

Pressurized fluid container 210 is disposed between support frame 208 and compression plate 212 such that pressurized fluid container 210 contacts at least a portion of support frame 208 and compression plate 212. A pressurized fluid source 216 is coupled in flow communication with pressurized fluid container 210 by a pressurized fluid line 218. Pressurized fluid container 210 is at least partially expandable and contractible such that an interior volume 220 of pressurized fluid container 210 changes in size according to the amount of pressurized fluid contained in pressurized fluid container 210. In the exemplary embodiment, pressurized fluid container 210 includes at least one flexible wall 222 to facilitate interior volume 220 changing size. Flexible wall 222 is substantially free of joints and seals to facilitate flexible wall 222 withstanding changes in temperature. In alternative embodiments, pressurized fluid container 210 has any configuration of walls that enable pressurized fluid container 210 to function as described herein.

In the exemplary embodiment, changes in interior volume 220 of pressurized fluid container 210 causes at least one of support frame 208 and compression plate 212 to move. In the exemplary embodiment, support frame 208 is fixed and compression plate 212 is movable in relation to support frame 208. Accordingly, compression plate 212 moves to accommodate changes in interior volume 220 of pressurized fluid container 210. For example, as interior volume 220 of pressurized fluid container 210 increases, pressurized fluid container 210 presses against support frame 208 and compression plate 212. As a result, compression plate 212 moves in a direction away from support frame 208 and towards fuel cell 104. Oppositely, when interior volume 220 decreases, compression plate 212 moves in a direction towards support frame 208 and away from fuel cell stack 206.

During operation of fuel cell module 200, fuel cell stack 206 increases in temperature, affecting the pressure of fuel cell stack 206. In some embodiments, fuel cell stack 206 reaches temperatures greater than approximately 600° C. (1112° F.). In further embodiments, fuel cell stack 206 reaches temperatures greater than approximately 800° C. (1472° F.). Typically, the pressure of fuel cell stack 206 has a tendency to decrease as temperature increases because components of fuel cell module 200 expand at different rates in response to increases in temperature. For example, in some embodiments, components supporting fuel cell stack 206 expand at a greater rate than fuel cell stack 206 as fuel cell module 200 increases in temperature such that pressure on fuel stack 206 is released.

In the exemplary embodiment, pressurized fluid is delivered to pressurized fluid container 210 through pressurized fluid line 218 from pressurized fluid source 216 to facilitate maintaining a desired pressure in fuel cell stack 206. If the pressure in fuel cell stack 206 decreases pressurized fluid flows into pressurized fluid container 210 to increase interior volume 220 such that compression plate 212 contacts fuel cell stack 206 with a force sufficient to counteract the decrease in pressure in fuel cell stack 206. Conversely, if the pressure in fuel cell stack 206 increases, pressurized fluid flows out of pressurized fluid container 210 causing interior volume 220 to decrease and, thereby, reduce the force of compression plate 212 on fuel cell stack 206. In alternative embodiments, pressurized fluid is any fluid that enables fuel cell module 200 to function as described herein.

In the exemplary embodiment, insulation 224 surrounds each fuel cell block 202 to inhibit heat loss to the surrounding environment. In alternative embodiments, fuel cell module 200 includes any type and configuration of insulation 224 that enables fuel cell module 200 to function as described herein. In further embodiments, insulation 224 is omitted. In the exemplary embodiment, pressurized fluid container 210, support frame 208, and compression plate 212 are entirely enclosed within insulation 224. Preferably, pressurized fluid line 218 is the only component that is coupled to fuel cell compression mechanism 204 and extends through insulation 224. As a result, fuel cell compression mechanism 204 facilitates fuel cell module 200 maintaining a temperature without substantial heat losses to the surrounding environment.

Pressurized fluid line 218 extends between fluid source 216 and three fuel cell blocks 202. In alternative embodiments, fuel cell module 200 includes any number of pressurized fluid sources 216 and fuel cell blocks 202. In the exemplary embodiment, pressurized fluid line 218 extends through insulation 224 and an opening 226 in support frame 208 of each fuel cell block 202. Pressurized fluid line 218 includes a regulator valve 228 to control the amount of pressurized fluid flowing through pressurized fluid line 218. Pressurized fluid line 218 further includes a pressure release valve 230 to release pressure build-ups. Additionally, pressurized fluid line 218 includes a pressure gauge 232 for monitoring pressure in pressurized fluid line 218. In some embodiments, pressurized fluid line 218 includes a plurality of regulator valves 228 and pressure gauges 232 to facilitate individually monitoring pressure of fuel cell blocks 202. In the exemplary embodiment, pressurized fluid line 218 is a stainless steel pipe having a diameter of approximately 3 millimeters (mm) (0.125 inches (in.)). In alternative embodiments, pressurized fluid line 218 is any materials and size that enables fuel cell compression mechanism 204 to function as described herein.

In the exemplary embodiment, pressurized fluid source 216 supplies a sufficient amount of pressurized fluid to pressurized fluid container 210 to maintain a relatively constant pressure inside pressurized fluid container 210. Preferably, the pressurized fluid inside pressurized fluid container 210 is maintained at a pressure in a range between about 2 pounds per square inch (psi) and about 100 psi. More preferably, the pressurized fluid inside pressurized fluid container 210 is maintained at a pressure in the range between about 6 psi and about 40 psi. In alternative embodiments, pressurized fluid inside pressurized fluid container 210 is maintained at any pressure that enables fuel cell module 200 to function as described herein.

Figure 3:
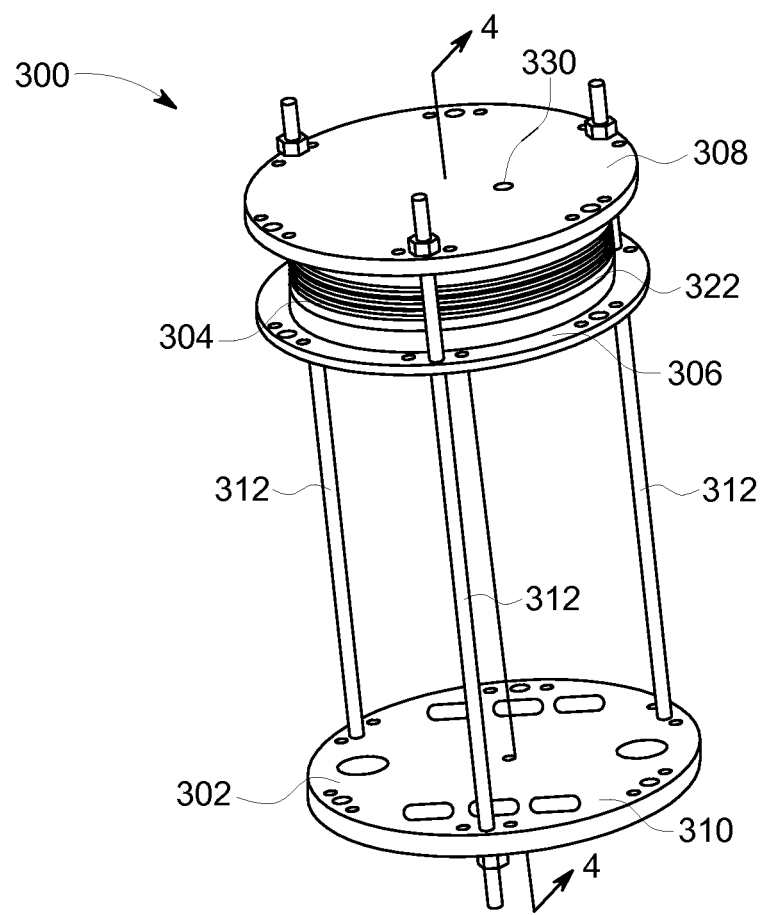
FIG. 3 is a perspective view of an exemplary fuel cell compression mechanism of the fuel cell module shown in FIG. 2.
Figure 4:
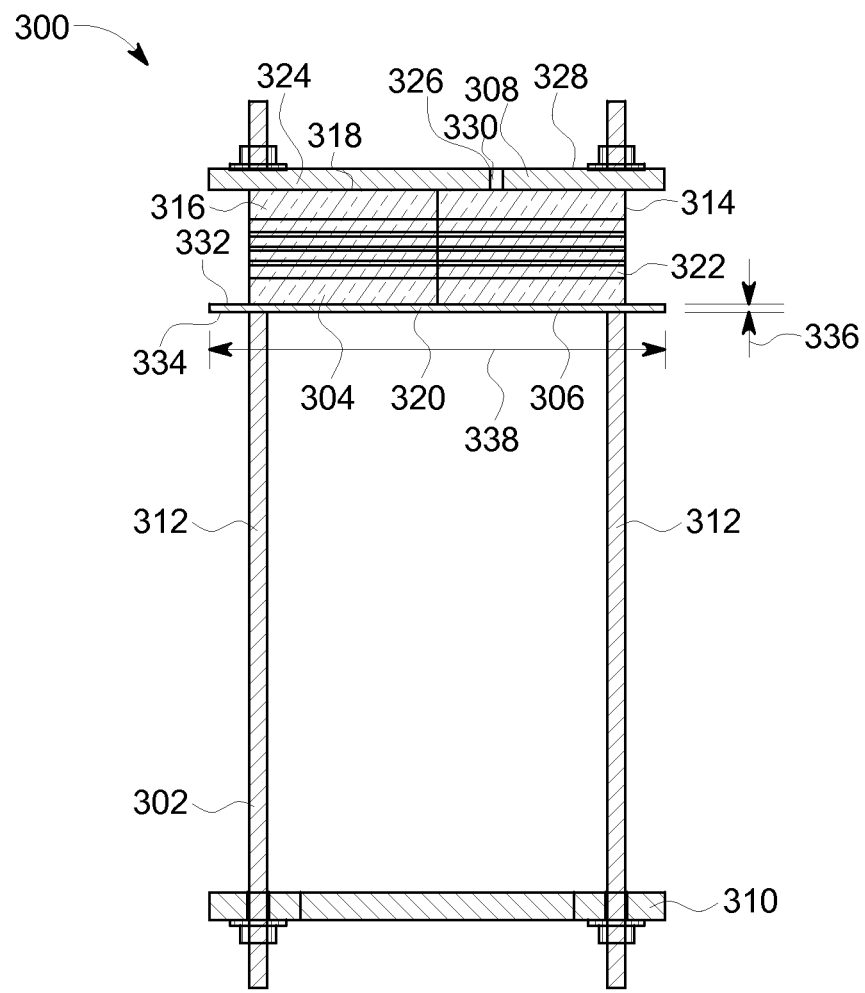
FIG. 4 is a section view of the fuel cell compression mechanism shown in FIG. 3 taken along section line A-A.

FIG. 3 is a perspective view of a fuel cell compression mechanism 300 and FIG. 4 is a section view of fuel cell compression mechanism 300 taken along section line A-A (shown in FIG. 3). Fuel cell compression mechanism 300 includes a support frame 302, a pressurized fluid container 304, and a compression plate 306. In reference to the orientation shown in FIG. 4, support frame 302 includes an upper support plate 308, a lower support plate 310, and a plurality of support members 312. Support members 312 extend between and are annularly spaced in relation to upper support plate 308 and lower support plate 310. In alternative embodiments, support frame 302 includes any number and configurations of support plates 308, 310 and/or support members 312 that enable fuel cell compression mechanism 300 to function as described herein. In some embodiments, support members 312, upper support plate 308, and/or lower support plate 310 are omitted. In the exemplary embodiment, support members 312 are rods. In alternative embodiments, support members 312 are any components that enable support frame 302 to function as described herein. For example, in some embodiments, support members 312 are straps and/or are square shaped.

In the exemplary embodiment, compression plate 306 is movably coupled to support members 312 between upper support plate 308 and lower support plate 310. Pressurized fluid container 304 is disposed between compression plate 306 and upper support plate 308. Compression mechanism 300 is configured for fuel cell stack 206 (FIG. 2) to be disposed between lower support plate 310 and compression plate 306. Accordingly, fuel cell compression mechanism 300 is configured such that compression plate 306 directly contacts pressurized fluid container 304 and fuel cell stack 206 during operation. In reference to the orientation shown in FIG. 4, pressurized fluid container 304 and upper support plate 308 are positioned above compression plate 306 and lower support plate 310 is positioned below compression plate 306. The orientation and arrangement of fuel cell compression mechanism 300 facilitates fuel cell compression mechanism 300 functioning efficiently and fitting within fuel cell module 200. In alternative embodiments, the components of fuel cell compression mechanism 300 are arranged and orientated in any manner that enables fuel cell compression mechanism 300 to function as described herein.

In the exemplary embodiment, pressurized fluid container 304 includes a casing 314 defining an interior space 316 configured to contain pressurized fluid. In reference to the orientation shown in FIG. 4, casing 314 includes a top wall 318, a bottom wall 320, and a sidewall 322 extending between top wall 318 and bottom wall 320. In the exemplary embodiment, upper support plate 308 and compression plate 306 are coupled to sidewall 322 such that upper support plate 308 at least partially forms top wall 318 and compression plate 306 at least partially forms bottom wall 320. In alternative embodiments, compression plate 306, upper support plate 308, top wall 318, and bottom wall 320 are separate components and casing 314 is configured such that top wall 318 contacts upper support plate 308 and bottom wall 320 contacts compression plate 306. In further alternative embodiments, casing 314 includes any number of walls that enable pressurized fluid container 304 to function as described herein. In the exemplary embodiment, sidewall 322 is at least partially flexible such that sidewall 322 extends or collapse as interior space 316 changes in volume. Specifically, sidewall 322 collapses to a folded shape and extends to an at least partially unfolded shape. In addition, sidewall 322 is positionable in intermediate positions where sidewall 322 is at least partially collapsed and at least partially extended. To facilitate flexible positioning, sidewall 322 is relatively thin and is corrugated throughout a substantial amount of its area. As sidewall 322 extends or collapses, at least one of top wall 318 and bottom wall 320 moves in relation to the other. Accordingly, in the exemplary embodiment, casing 314 of pressurized fluid container 304 is a bellows structure. In alternative embodiments, sidewall 322 has any configuration that enables pressurized fluid container 304 to function as described herein. In some embodiments, sidewall 322 is omitted and pressurized fluid container 304 has any flexible components that enable pressurized fluid container 304 to function as described herein. For example, in some embodiments, pressurized fluid container 304 includes a substantially pillow-shaped casing (not shown). In further embodiments, pressurized fluid container 304 has rigid walls (not shown) that are flexibly engaged such that the interior space of pressurized fluid container 304 changes in volume.

In the exemplary embodiment, top wall 318, bottom wall 320, and sidewall 322 are materials capable of withstanding relatively high temperatures such that pressurized fluid container 304 withstands the relatively high operating temperatures of fuel cell module 200. As used herein, relatively high temperatures are temperatures greater than approximately 600° C. (1112° F.). Preferably, top wall 318, bottom wall 320, and sidewall 322 are metals such as stainless steel, alkali metal, Inconel metal, and combinations thereof. In alternative embodiments, top wall 318, bottom wall 320, and sidewall 322 are any materials that enable pressurized fluid container 304 to function as described herein. In the exemplary embodiment, top wall 318, bottom wall 320, and sidewall 322 are coupled together with welds. In alternative embodiments, top wall 318, bottom wall 320, and sidewall 322 are coupled together in any manner that enables pressurized fluid container 304 to function as described herein.

In the exemplary embodiment, top wall 318 includes a top surface 324 defining a casing inlet opening 326 therein. In addition, upper support plate 308 includes an exterior surface 328 defining an inlet opening 330 therein. Casing inlet opening 326 and inlet opening 330 are configured for pressurized fluid line 218 (shown in FIG. 2) to extend through as pressurized fluid line 218 extends from the exterior of fuel cell module 200 to the interior of pressurized fluid container 304.

Compression plate 306 includes a first surface 332 and a second surface 334 opposite first surface 332. Compression plate 306 has a thickness 336 measured between first surface 332 and second surface 334. In some embodiments, thickness 336 is in a range between about 0.5 mm (0.02 in.) and about 50 mm (2 in.). In the exemplary embodiment, thickness 336 is approximately 6 mm (0.25 in.). In the exemplary embodiment, compression plate 306 has a circular shape including a diameter 338. In some embodiments, diameter 338 is in a range between about 50 mm (2 in.) and about 914 mm (36 in.). In the exemplary embodiment, diameter 338 is approximately 406 mm (16 in.). In alternative embodiments, compression plate 306 is any shape and size that enables compression plate 306 to function as described herein.

Referring to FIGS. 1-4, a method of generating power using an electric power generation system 100 includes channeling pressurized fluid 122 through pressurized fluid line 124, 218 coupled to pressurized fluid source 120, 216 and pressurized fluid container 210, 304. The pressure of pressurized fluid 122 in pressurized fluid container 210, 304 is maintained at a predetermined value. Flexible wall 222, 322 is positioned in an at least partially extended position. The method further includes positioning flexible wall 222, 322 in an at least partially collapsed position such that interior volume 220 of pressurized fluid container 210, 304 changes. Compression plate 212, 306 is moved in relation to support plate 208, 310 such that compressive forces on fuel cell stack 206 are maintained at a desired pressure, which is constant or varied. In some embodiments, the pressure of pressurized fluid 122 in pressurized fluid container 210 is monitored. In some embodiments, the pressure of fuel stack 206 is varied to meet system needs of electric power generation system 100.

The above described fuel cell modules include a compression mechanism to increase the efficiency and reduce the cost of generating electric power using fuel cell modules. In particular, the embodiments described herein provide consistent and reliable compression of a fuel cell and reduce the heat lost from the fuel cell modules. The embodiments described herein also facilitate a single pressurized fluid source supplying pressurized fluid to a plurality of fuel cell modules including individual compression mechanisms. Additionally, the compression mechanism increases the uniformity of the compressive forces applied to the fuel cells. Also, the compression mechanism increases the reliability of the fuel cell modules by reducing required maintenance.

An exemplary technical effect of the methods, systems, and apparatus described herein includes at least one of: (a) increasing the operating efficiency of fuel cell modules; (b) decreasing the time and cost required to maintain and repair fuel cell modules; (c) reducing the cost of assembling and operating fuel cell modules; (d) reducing the amount of heat lost from fuel cell modules to the surrounding environment; (e) maintaining a constant pressure in fuel cells; and (f) increasing the uniformity of compressive forces exerted on a fuel cell during operation.

Exemplary embodiments of fuel cell modules that include a compression mechanism are described above in detail. The fuel cell modules that include a compression mechanism, and methods of operating such systems and devices are not limited to the specific embodiments described herein, but rather, components of systems and/or steps of the methods may be utilized independently and separately from other components and/or steps described herein. For example, the methods may also be used in combination with other systems, and are not limited to practice with only the fuel cell modules, fuel cell systems, and methods as described herein. Rather, the exemplary embodiment can be implemented and utilized in connection with many other fuel cell applications that are currently configured to receive and accept fuel cells, e.g., and without limitation, distributed generation facilities in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric power generation system comprising:
a fuel cell module comprising:
a fuel cell stack comprising a plurality of fuel cells;
a compression mechanism coupled to the fuel cell stack and configured to maintain a uniform compressive force on said fuel cell stack, said compression mechanism consisting essentially of:
an upper support plate, and a single compression plate opposing said upper support plate and comprising a surface contacting said fuel cell,
wherein said upper support plate is maintained in a fixed position relative to the fuel cell stack during fuel cell operation with a plurality of support members,
wherein the plurality of support members are selected from the group consisting of rods and straps,
wherein the compression plate is movable in relation to said upper support plate; and
wherein the surface of the compression plate is substantially planar and directly contacts the fuel cell stack throughout the area of the surface such that the force of the fuel cell stack from the surface of the compression plate is distributed uniformly throughout the entire fuel cell stack,
a pressurized fluid container disposed between said compression plate and said upper support plate, said pressurized fluid container comprising a casing defining an internal space configured to contain pressurized fluid, said pressurized fluid container configured to maintain a constant pressure within the internal space of said fuel cell stack by transmitting uniform pressure to the compression plate to the fuel cell stack;
a pressurized fluid source; and
a fluid line coupled to said pressurized fluid source and said pressurized fluid container.

2. The electric power generation system in accordance with claim 1, wherein said pressurized fluid container is configured to withstand temperatures of at least about 600° Celsius (C).

3. The electric power generation system in accordance with claim 1, wherein said casing forms a bellows structure.

4. The electric power generation system in accordance with claim 1, wherein said casing comprises a first end wall, a second end wall, and a side wall extending between said first end wall and said second end wall, said side wall compressible and extendible such that at least one of said first end wall and said second end wall moves in relation to the other.

5. The electric power generation system in accordance with claim 4, wherein said support plate and said compression plate are coupled to said sidewall.

6. The electric power generation system in accordance with claim 1, wherein said fuel cell module further comprising a lower support plate opposite said upper support plate, said fuel cell disposed between said compression plate and said lower support plate.

7. The electric power generation system in accordance with claim 6, wherein said fuel cell module further comprises a plurality of support members coupled to and extending between said upper support plate and said lower support plate, said compression plate movable along said plurality of support members.

8. The electric power generation system in accordance with claim 1 further comprising at least one of a regulator and a bleed-off valve, said at least one of a regulator and a bleed off valve coupled to said fluid line to control the flow of pressurized fluid through said fluid line.

9. The electric power generation system in accordance with claim 8 further comprising a valve coupled to said fuel cell module to facilitate maintaining a predetermined constant pressure in said pressurized fluid container.

10. A fuel cell module comprising: a fuel cell stack comprising a plurality of fuel cells;
a compression mechanism coupled to the fuel cell stack and configured to maintain a uniform compressive force on said fuel cell stack, said compression
mechanism consisting essentially of:
an upper support plate, and a single compression plate opposing said upper support plate and comprising a surface contacting said fuel cell, wherein said upper support plate is maintained in a fixed position relative to the fuel cell stack during fuel cell operation and said compression plate is movable in relation to said upper support plate; and
a pressurized fluid container disposed between said compression plate and said upper support plate, said pressurized fluid container comprising a casing defining an internal space configured to contain a pressurized fluid, said pressurized fluid container configured to be coupled to a pressurized fluid source, the pressurized fluid source configured to supply the pressurized fluid to said pressurized fluid container to maintain a predetermined substantially constant pressure within the internal space and to maintain a constant and uniform pressure throughout the entire fuel cell stack, said casing comprising at least one flexible wall and configured to change a volume of the internal space such that said compression plate moves in relation to said upper support plate.

11. The fuel cell module in accordance with claim 10, wherein said pressurized fluid container is configured to withstand temperatures of at least about 600° Celsius (C).

12. The fuel cell module in accordance with claim 10, wherein said casing forms a bellows structure.

13. The fuel cell module in accordance with claim 10, wherein said casing comprises a first end wall, a second end wall, and a side wall extending between said first end wall and said second end wall, said side wall compressible and extendible such that at least one of said first end wall and said second end wall moves in relation to the other.

14. The fuel cell module in accordance with claim 10, wherein said d fuel cell block further comprising a lower support plate opposite said upper support plate, said fuel cell disposed between said compression plate and said lower support plate.

15. The fuel cell module in accordance with claim 14 further comprising a plurality of members coupled to and extending between said upper support plate and said lower support plate, said compression plate movable along said plurality of members.

16. A method of generating power using an electric power generation system, the electric power generation system including a fuel cell block and a pressurized fluid source, the fuel cell block including a fuel cell stack comprising a plurality of fuel cells, and a compression mechanism coupled to the fuel cell stack and configured to maintain a uniform compressive force on said fuel cell stack, said compression mechanism consisting essentially of a pressurized fluid container disposed between a single compression plate and a upper support plate opposing said compression plate, said method comprising:

channeling pressurized fluid through a fluid line coupled to the pressurized fluid source and the pressurized fluid container, the pressurized fluid container including a casing defining an interior space for containing the pressurized fluid, the casing including a flexible wall, the flexible wall positionable in an extended position, a collapsed position, and at least one intermediate position;

maintaining the pressure of the pressurized fluid in the pressurized fluid container at a predetermined value;

positioning the flexible wall in one of the extended position, the collapsed position, and that at least one intermediate position such that the interior space changes in volume; and moving the compression plate in relation to the support plate such that pressure within said fuel cell stack remains substantially constant and uniform throughout the entire fuel cell stack, wherein the said upper support plate is maintained in a fixed position relative to the fuel cell stack during fuel cell operation.

17. The method in accordance with claim 16 further comprising monitoring the pressure in the pressurized fluid container.

18. The method in accordance with claim 17, wherein said maintaining the pressure comprises maintaining the pressure in the pressurized fluid container at a pressure in the range between about 2 pounds per square inch (psi) and about 100 psi.

19. The method in accordance with claim 18, wherein said maintaining the pressure comprises maintaining the pressure in the pressurized fluid container at a pressure in the range between about 6 psi and about 40 psi.

* * * * *